US008258955B1

(12) United States Patent
Hyde et al.

(10) Patent No.: US 8,258,955 B1
(45) Date of Patent: *Sep. 4, 2012

(54) ADAPTABLE DETECTION THRESHOLD FOR RFID TAGS AND CHIPS

(75) Inventors: John D. Hyde, Corvallis, OR (US); Kurt E. Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,413

(22) Filed: Jan. 24, 2011

Related U.S. Application Data

(62) Division of application No. 11/670,587, filed on Feb. 2, 2007, now Pat. No. 7,917,088.

(51) Int. Cl.
*H04B 7/00* (2006.01)
*H04B 1/16* (2006.01)
*G05B 11/01* (2006.01)
*G08C 19/16* (2006.01)

(52) U.S. Cl. ............ 340/572.1; 455/41.2; 455/336; 340/12.51; 340/13.26; 340/572.4

(58) Field of Classification Search ........ 455/41.1–41.3, 455/296, 309, 312, 336–337; 340/10.1, 10.31, 340/12.34, 12.51, 13.26, 572.1–572.4; 375/260, 375/340, 343

See application file for complete search history.

(56) References Cited

U.S. PATENT DOCUMENTS

| 4,471,345 | A | 9/1984 | Barrett |
| 4,701,755 | A | 10/1987 | Nakagawa et al. |
| 4,783,783 | A | 11/1988 | Nagai et al. |
| 4,935,702 | A | 6/1990 | Mead et al. |
| 5,068,521 | A | 11/1991 | Yamaguchi |
| 5,164,942 | A | 11/1992 | Kamerman et al. |
| 5,307,515 | A | 4/1994 | Kuo et al. |
| 5,448,242 | A | 9/1995 | Sharpe et al. |
| 5,491,484 | A | 2/1996 | Schuermann |
| 5,541,604 | A | 7/1996 | Meier |
| 5,640,151 | A | 6/1997 | Reis et al. |
| 5,686,902 | A | 11/1997 | Reis et al. |
| 5,805,632 | A | 9/1998 | Leger |
| 5,933,039 | A | 8/1999 | Hui et al. |
| 5,939,945 | A | 8/1999 | Thewes et al. |
| 5,952,922 | A | 9/1999 | Shober |
| 5,952,935 | A | 9/1999 | Mejia et al. |
| 6,031,419 | A * | 2/2000 | Roberts et al. ............... 329/349 |

(Continued)

FOREIGN PATENT DOCUMENTS

EP    0 298 618    1/1989

(Continued)

OTHER PUBLICATIONS

International Search Report and Written Opinion for PCT/US2005/012490 mailed Jul. 25, 2005.

(Continued)

*Primary Examiner* — Simon Nguyen
(74) *Attorney, Agent, or Firm* — Turk IP Law, LLC

(57) ABSTRACT

RFID tags, tag circuits, and methods are provided that reduce at least in part the distortion to received wireless signals, which is caused by interference in the environment. Two or more thresholds are used to digitize the received signal implemented by two or more demodulators. Multiple low pass and digital filters may be implemented with the demodulators, allowing removal of narrow pulses caused by the interference and reduction of beat tone amplitude.

16 Claims, 18 Drawing Sheets

U.S. PATENT DOCUMENTS

| | | | |
|---|---|---|---|
| 6,034,603 | A | 3/2000 | Steeves |
| 6,100,765 | A | 8/2000 | Pax et al. |
| 6,130,632 | A | 10/2000 | Opris |
| 6,134,182 | A | 10/2000 | Pilo et al. |
| 6,147,591 | A | 11/2000 | Stobbe et al. |
| 6,161,762 | A | 12/2000 | Bashan et al. |
| 6,177,861 | B1 | 1/2001 | MacLellan et al. |
| 6,208,235 | B1 | 3/2001 | Trontelj |
| 6,266,362 | B1 | 7/2001 | Tuttle et al. |
| 6,294,953 | B1 | 9/2001 | Steeves |
| 6,317,027 | B1 | 11/2001 | Watkins |
| 6,320,788 | B1 | 11/2001 | Sansbury et al. |
| 6,357,025 | B1 | 3/2002 | Tuttle |
| 6,603,391 | B1 | 8/2003 | Greeff et al. |
| 6,617,962 | B1 | 9/2003 | Horwitz et al. |
| 6,636,146 | B1 * | 10/2003 | Wehoski ............ 340/10.4 |
| 6,765,484 | B2 | 7/2004 | Eagleson et al. |
| 6,831,562 | B2 | 12/2004 | Rodgers et al. |
| 6,963,270 | B1 | 11/2005 | Gallagher et al. |
| 7,005,965 | B2 | 2/2006 | Chen et al. |
| 7,023,342 | B2 | 4/2006 | Corbett et al. |
| 7,039,412 | B2 | 5/2006 | Sanhu et al. |
| 7,044,387 | B2 | 5/2006 | Becker et al. |
| 7,183,926 | B2 | 2/2007 | Diorio et al. |
| 7,215,976 | B2 | 5/2007 | Brideglall |
| 7,265,610 | B2 * | 9/2007 | Enguent ............ 329/347 |
| 7,356,316 | B2 | 4/2008 | Ogiso et al. |
| 7,604,177 | B2 * | 10/2009 | Konuma et al. ........ 235/492 |
| 7,917,088 | B2 * | 3/2011 | Hyde et al. ......... 455/41.2 |
| 7,973,643 | B2 | 7/2011 | Hyde et al. |
| 8,111,140 | B2 * | 2/2012 | Rizzo et al. ......... 340/10.4 |
| 2001/0010491 | A1 | 8/2001 | Marneweck et al. |
| 2002/0153996 | A1 | 10/2002 | Chan et al. |
| 2002/0167405 | A1 | 11/2002 | Shanks et al. |
| 2004/0174244 | A1 | 9/2004 | Eidemiller |
| 2005/0025187 | A1 | 2/2005 | Li et al. |
| 2005/0052279 | A1 | 3/2005 | Bridgelall |
| 2005/0104790 | A1 | 5/2005 | Duron et al. |
| 2005/0121526 | A1 | 6/2005 | Stewart et al. |
| 2005/0128159 | A1 | 6/2005 | Wang et al. |
| 2005/0201450 | A1 * | 9/2005 | Volpi et al. ........... 375/150 |
| 2006/0111051 | A1 | 5/2006 | Barink et al. |
| 2006/0186995 | A1 | 8/2006 | Wu et al. |
| 2006/0255131 | A1 | 11/2006 | Stewart |
| 2009/0052564 | A1 * | 2/2009 | Hayashi et al. ....... 375/260 |

FOREIGN PATENT DOCUMENTS

| | | |
|---|---|---|
| EP | 0 681 192 | 8/1995 |
| EP | 0 696 852 | 2/1996 |
| EP | 0 715 417 | 6/1996 |
| EP | 0 939 496 | 9/1999 |
| EP | 0 994 364 | 4/2000 |
| JP | 01173889 | 7/1989 |
| WO | 0173854 | 10/2001 |

OTHER PUBLICATIONS

EPCglobal, Inc "Specification of RFID Air Interface—EPC Radio-Frequency Identity Protocols Class-1 Generation-2 UHF RFID Protocol for Communications at 860 MHz-960 MHz, Version 1.08." (a.k.a. "The Gen 2 Spec") EPCglobal Inc. Dec. 14, 2004.

EPCglobal, Inc "Specification of RFID Air Interface—EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005.

"Declaration of Stacy L. Jones authenticating attached website materials", www.autoid.org/SC31/sc_31_wg4_sg3.htm, Sep. 1, 2006.

Carley, Richard L., "Trimming Analog Circuits Using Floating-Gate Analog MOS Memory", IEEE Journal of Solid-State Circuits, vol. 24, No. 6, Dec. 1989, 1569-1575.

Raszka, et al., "Embedded Flash Memory for Security Applications in a 0.13 µm CMOS Logic Process", Digest of Technical Papers, IEEE International Solid-State Ciruits Conference, 2004, 46.

Weis, et al., "Security and Privacy Aspects of Low-Cost Radio Frequency Systems", Laboratory for Computer Science, Massachesetts Institute of Technology, Cambridge, MA., 12 Pages.

Yoshida, Junko, "RFID "Kill"Feature Aims to Soothe Privacy Fears", EE Times, Apr. 28, 2003, 1-86.

RFID "Kill" Feature Aims to Soothe Privacy Fears, EE Times, Apr. 28, 2003, 2 pages.

International Search Report and Written Opinion for PCT/US2006/010473 mailed Sep. 14, 2006.

Non-Final Office Action U.S. Appl. No. 12/749,648 mailed May 8, 2012.

* cited by examiner

SIGNAL PATH DURING R→T

SIGNAL PATH DURING T→R

US 8,258,955 B1

ADAPTABLE DETECTION THRESHOLD FOR RFID TAGS AND CHIPS

RELATED APPLICATIONS

This utility patent application is a divisional of U.S. patent application Ser. No. 11/670,587, filed Feb. 2, 2007, which is incorporated herein by reference. The benefit of the earlier filing date of the parent application is hereby claimed under 35 U.S.C. §120.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A problem can occur if the RF wave received by the tag includes distortion due to interference. Interference can arise from a variety of intentional and unintentional transmission sources in the vicinity. Interfering RF signals may be generated, for example, from nearby wireless devices such as other RFID readers, and also cellular telephones, personal digital assistants, and the like.

Tag interference rejection may depend on several factors such as interferer type (e.g. CW or modulated), interferer frequency offset, and Signal-to-Interferer Ratio (SIR). When the tag circuit converts the received RF wave into a received signal, that signal is also distorted due to the interference. The distorted signal may cause false bits to be detected by the RFID tag, which in turn can result in the RFID tag not being able to detect the interrogating RF wave reliably, or parse its commands.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to reducing effects of interference in signals received by an RFID tag, using two or more thresholds to detect the signals. In some embodiments, two or more demodulators may be employed, further enabling, optionally, use of multiple digital filters with different apertures for variable detection settings, multiple low pass filters for reducing beat tone amplitude.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
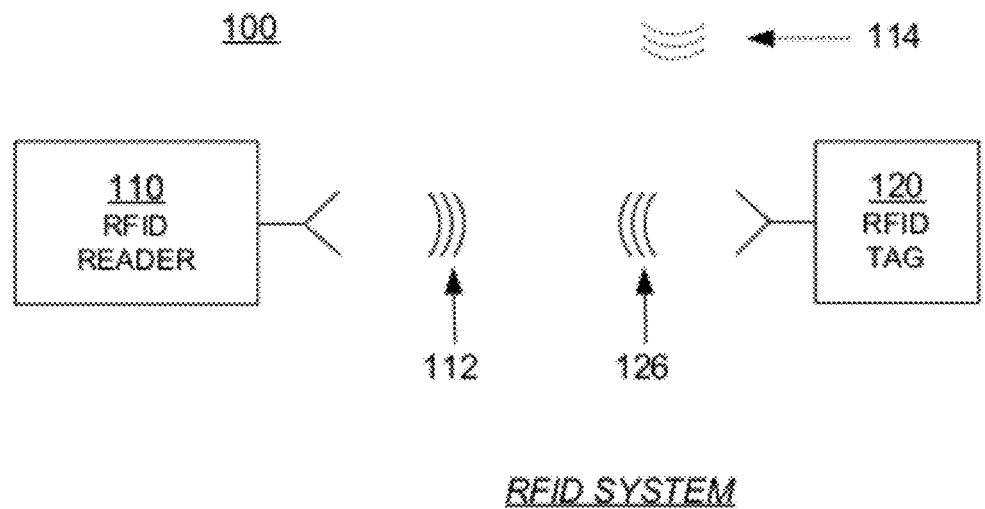
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Floating Point Gate Array (FPGA), etc.

FIG. 1 is a diagram of an example RFID system including an RFID reader communicating with an RFID tag in its field of view. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

In the vicinity there may also be interference, shown here in the form of RF wave 114 from another other source (not shown). RF wave 114 arrives at tag 120 at the same time as intended interrogating signal 112. RF signals 112, 126, and 114 are shown as discontinuous to denote their possibly different treatment, but that is only for illustration. They may, in fact, be part of the same continuous signal. RF wave 114 might not have the same carrier frequency as interrogating signal 112. Indeed a frequency RF wave 114 may be regarded as a co-channel, a near-channel, or a far-channel, as will be seen below.

Figure 2:
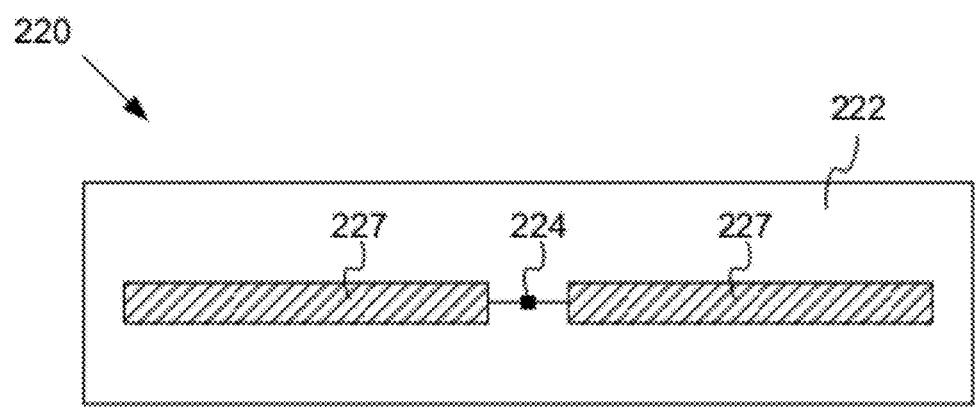
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
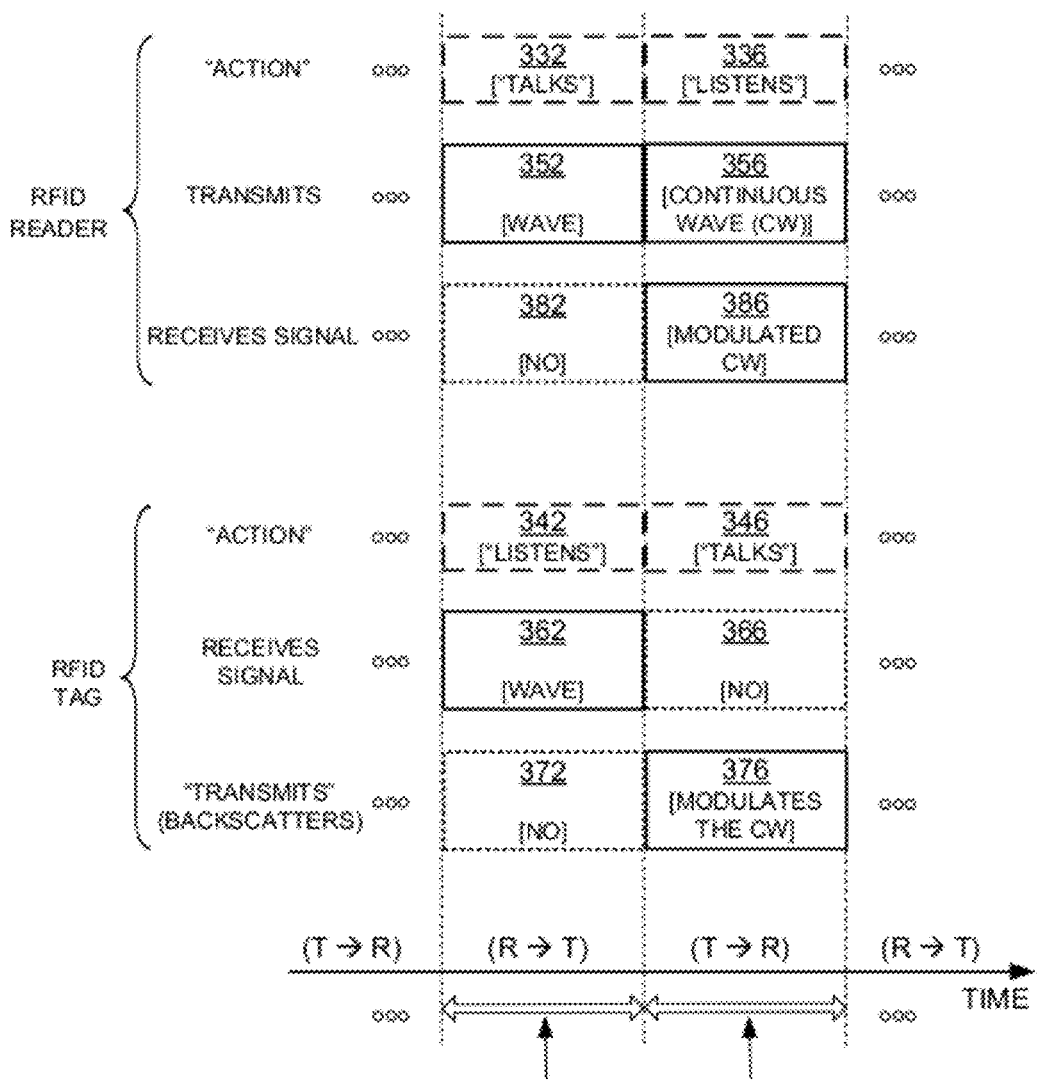
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz—960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
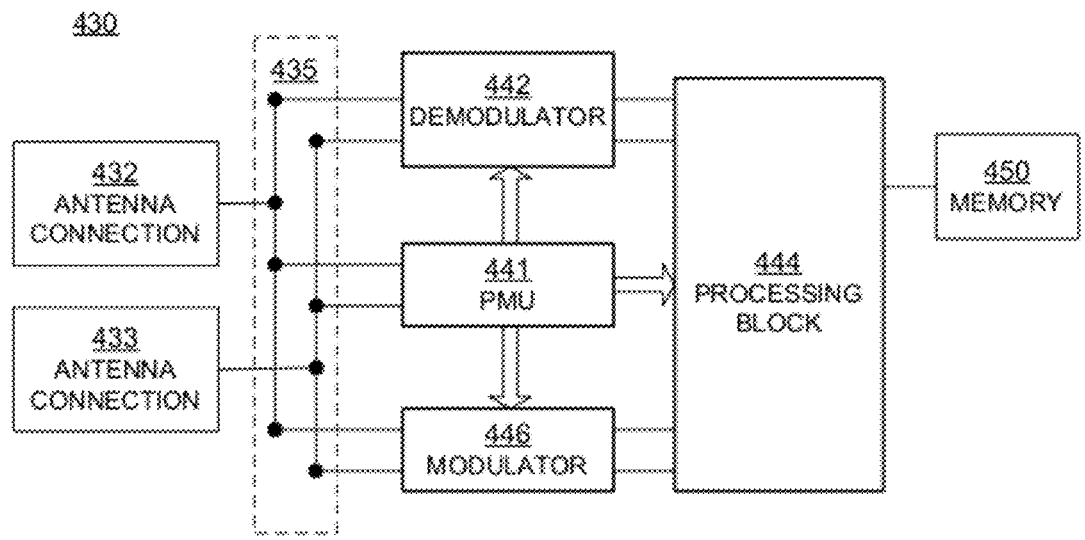
FIG. 4 is a block diagram of an implementation of an electrical circuit formed in an IC of the tag of FIG. 2.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more than two antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both R→T and T→R sessions, whether or not the received RF wave is modulated.

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 430 additionally includes a memory 450, which stores information. Memory 450 is preferably implemented as a Non Volatile Memory (NVM), which means that its stored information is retained, even when circuit 430 does not have power, as is frequently the case for a passive RFID tag.

It will be recognized at this juncture that the shown components of circuit 430 can also be those of a circuit of an RFID tag according to the invention, without needing PMU 441. Indeed, an RFID tag can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session, in treating a signal. The different operations are described below.

Figure 5A:
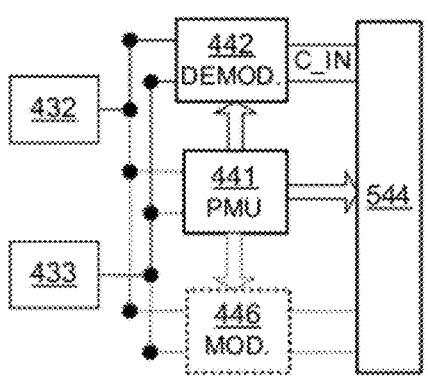
FIG. 5A is the block diagram of FIG. 4, modified to emphasize a signal operation during a R→T session of FIG. 3.

FIG. 5A shows version 530-A of components of circuit 430 of FIG. 4, further modified to emphasize a signal operation during a R→T session (receive mode of operation) during time interval 312 of FIG. 3. An RF wave is received from antenna connections 432, 433, a signal is demodulated from demodulator 442, and then input to processing block 444 as C_IN. In one embodiment according to the present invention, C_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
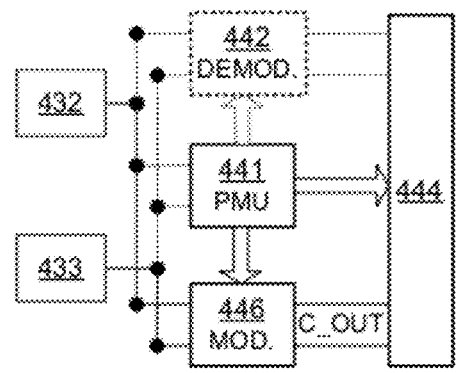
FIG. 5B is the block diagram of FIG. 4, modified to emphasize a signal operation during a T→R session of FIG. 3.

FIG. 5B shows version 530-B of components of circuit 430 of FIG. 4, further modified to emphasize a signal operation during a T→R session during time interval 326 of FIG. 3. A signal is output from processing block 444 as C_OUT. In one embodiment according to the present invention, C_OUT may include a transmission stream of symbols. C_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
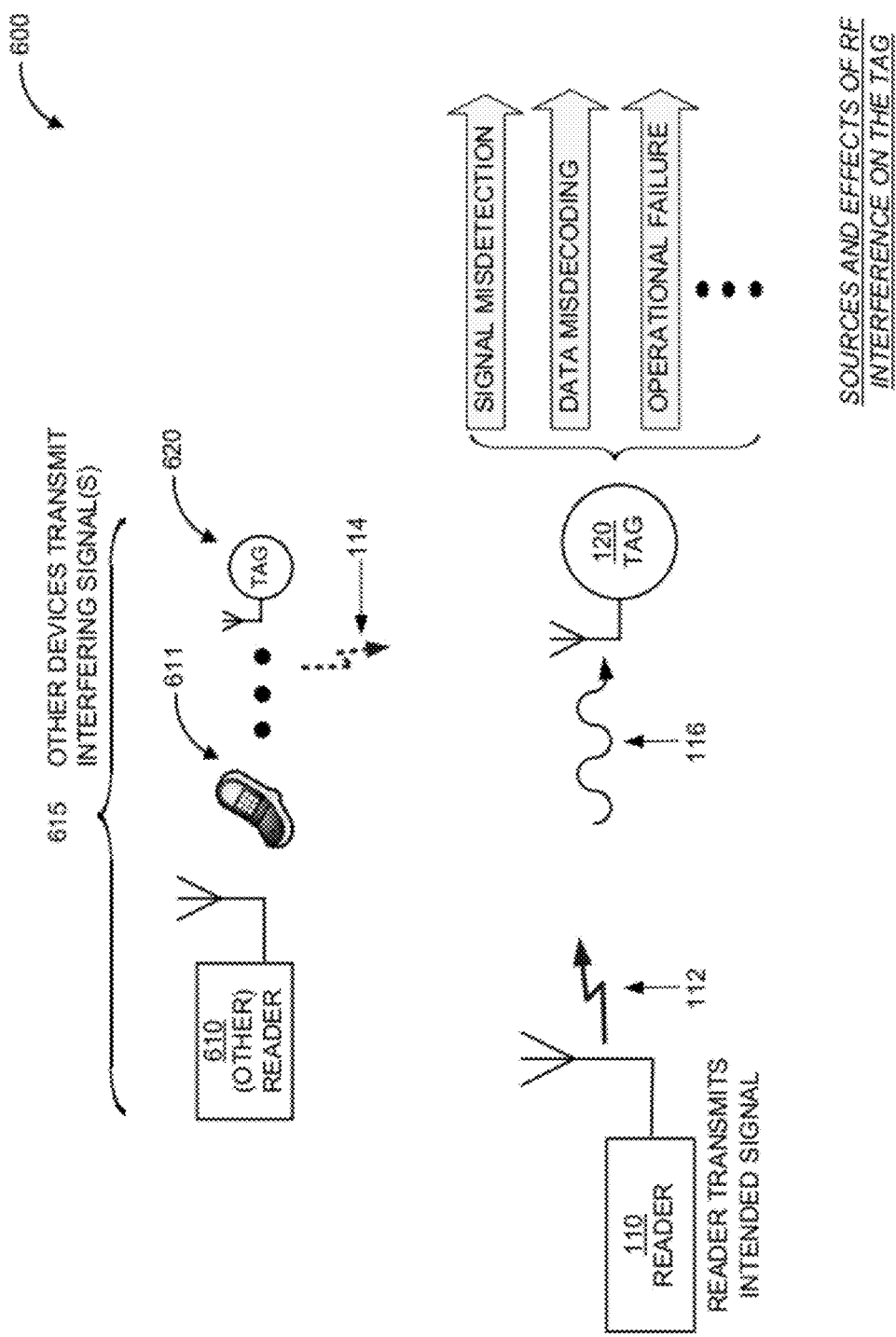
FIG. 6 is a conceptual diagram for explaining sources and effects of RF interference on the RFID tag for the system of FIG. 1.

FIG. 6 is a conceptual diagram for explaining sources and effects of RF interference on the RFID tag for the system of FIG. 1.

As shown in the figure, reader 110 transmits an intended signal in form of RF wave 112. Wave 112 travels through a medium, usually air, and in an ideal operation, wave 112 would arrive at tag 120 without any distortion from interference. Then it would be received and processed by tag 120.

In the real world, however, there are interference sources in the environment that wave 112 travels in. Wave 114 illustrated represents interfering signal(s) that can distort wave 112 as it travels. Wave 114 may be transmitted intentionally or unintentionally by a number of sources such as other reader 610, cellular phone 611, tag 620, and the like. These sources may be grouped as other devices 615 that transmit the interfering signal(s).

Accordingly, as wave 112 travels through the medium, it is affected by wave 114, and arrives at tag 120 as wave 116. Wave 116 may be modified in more than one way from wave 112. For example, its amplitude may be distorted, extra frequency components may be added, and even its phase may be distorted.

Since distorted wave 116 is received instead of wave 112 a number of undesirable effects may result for the tag. Such effects may include signal misdetection, data misdecoding, operational failure, and the like.

Figure 7A:
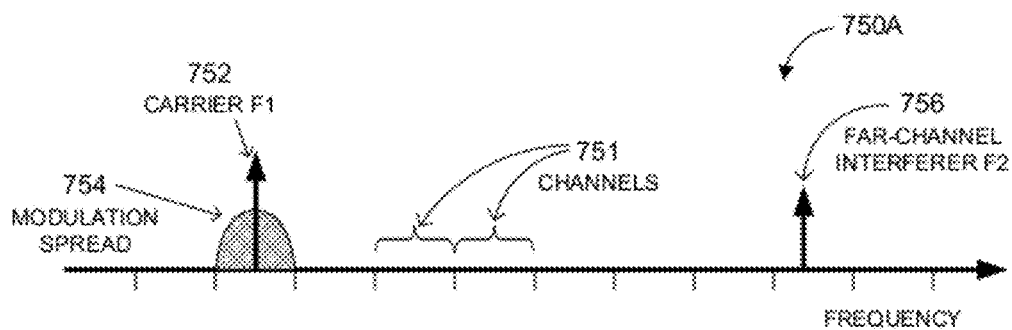
FIG. 7A is a diagram for illustrating the frequency relationship between a typical RFID communication signal and a far-channel interferer arising from a source such as those of FIG. 6.

FIG. 7A is a diagram for illustrating the frequency relationship between a typical RFID communication signal and a far-channel interferer arising from a source such as those of FIG. 6.

Like some other RF signals, RFID communication signals include a carrier at frequency F1 (752) and a modulation spread 754 around the carrier 752. A width of the modulation spread is typically defined as a channel. Thus, a spectrum where RFID communication signals may be found (e.g. an allowed band) includes multiple channels 751.

As illustrated in spectrum diagram 750A of FIG. 7A, a signal received by a tag includes carrier 752 and its modulation spread 754 in one channel. In some scenarios, an interference signal 756 may be a far-channel interferer at frequency F2, which is several channels away from the received signal 752.

Figure 7B:
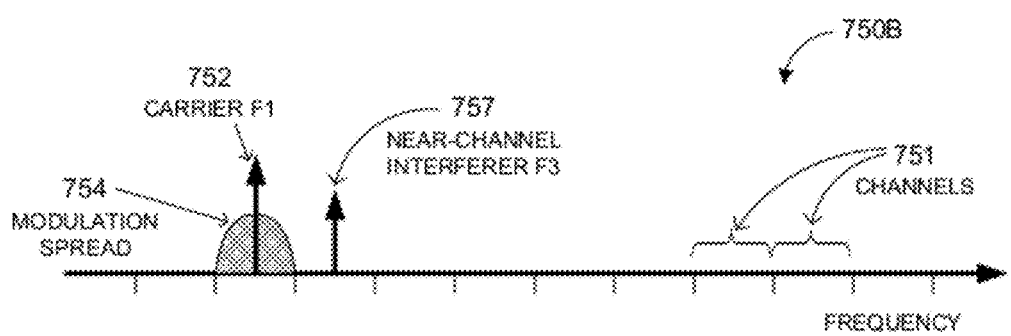
FIG. 7B is a diagram for illustrating the frequency relationship between a typical RFID communication signal and a near-channel interferer arising from a source such as those of FIG. 6.

FIG. 7B is a diagram for illustrating the frequency relationship between a typical RFID communication signal and a near-channel interferer arising from a source such as those of FIG. 6.

A different interference scenario is shown in frequency diagram 750B, where the interference signal 757 is on a next channel to the received signal 752. Thus, the "close" interference signal is called a near-channel intereferer.

Figure 7C:
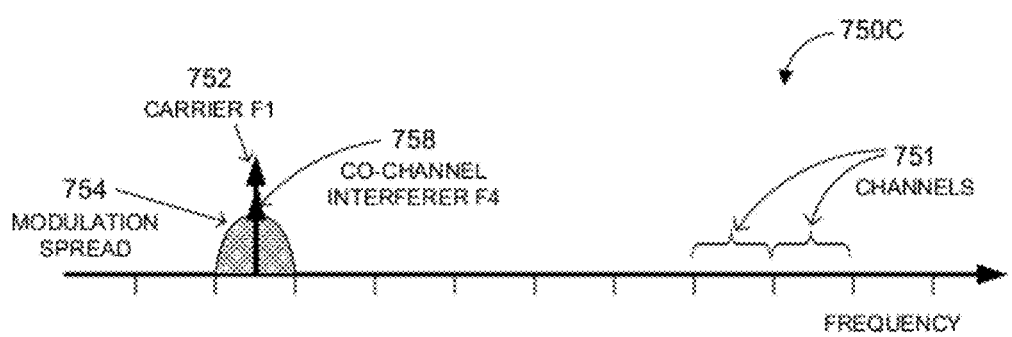
FIG. 7C is a diagram for illustrating the frequency relationship between a typical RFID communication signal and a co-channel interferer arising from a source such as those of FIG. 6.

FIG. 7C is a diagram for illustrating the frequency relationship between a typical RFID communication signal and a co-channel interferer arising from a source such as those of FIG. 6.

In a yet different scenario, illustrated in frequency diagram 750C, the interfering signal 758 has the same carrier frequency as the received signal (F1=F4). Therefore, the interference signal 758 is called a co-channel interferer.

Figure 8:
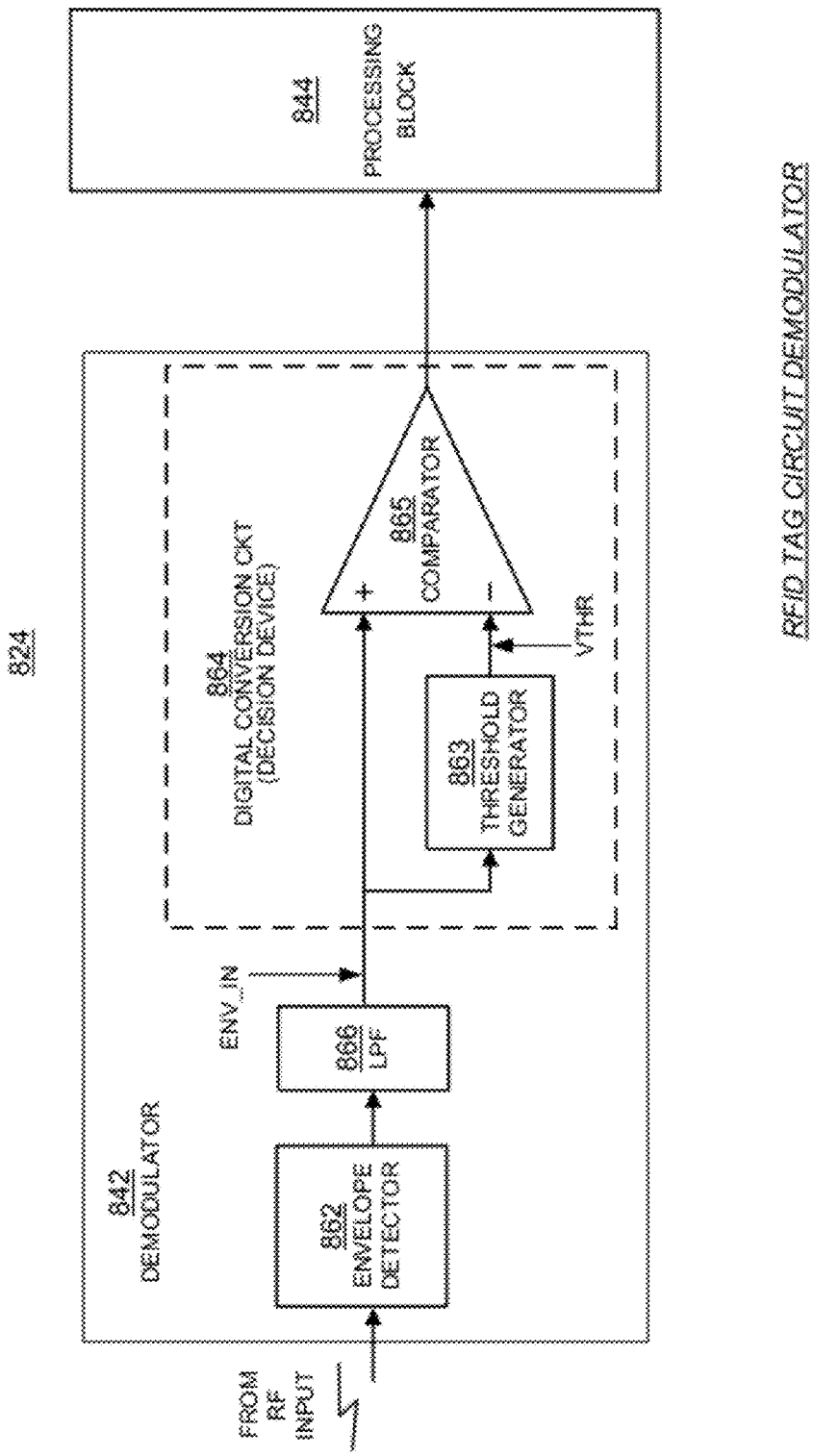
FIG. 8 schematically illustrates circuits of an RFID tag circuit in the prior art.

FIG. 8 schematically illustrates circuits of an RFID tag circuit in the prior art.

Circuit 824 shows functional blocks of a demodulator circuit, such as the demodulator circuit of the RFID tag of FIG. 4, for explaining how interference affects adversely operation of the tag. A processor 844 is shown, which can be made the same way as processor 444. In addition, a demodulator 842 is shown, which can be made in any number of ways, for example in the same way as demodulator 442.

Demodulator 842 is arranged to receive a wireless RF input signal from an RFID reader, and convert it to a digital output signal. The signal at the output of demodulator 842 is ultimately derived from the wireless RF input signal, which can include distortion due to interference.

Furthermore, processor 844 receives the signal from demodulator 842, and uses it to decode commands, data, and the like, perform actions associated with the decoded commands, and respond to the reader.

It is apparent from FIG. 8 that any distortion in the RF input due to interference gives rise to an artifact feature at the digital output signal of demodulator 842. The artifact feature is a feature that did not arise properly, and yet is received and interpreted by processor 844. As such, it can cause processor 844 to not respond exactly as intended.

Demodulator 842 can be made in any number of ways. One such way is now described, along with the manner in which artifact features in the demodulator output signal arise due to interference in the RF input.

Demodulator 842 includes an envelope detector 862, followed by a digital conversion circuit 864. A low pass filter LPF 866 may be placed between the envelope detector 862 and digital conversion circuit 864. Envelope detector 862 is configured to convert modulated RF input to an analog baseband signal, which after filtering by LPF 866 is provided to digital conversion circuit 864 as ENV_IN. ENV_IN corresponds to an envelope of the received wireless signal.

Envelope detector 862 is well known in the art, and may include an envelope detector core. In some implementations, the low pass filter may be an integral part of the envelope detector. The envelope detector core may include a diode detector in its simplest form, but is not limited to a diode detector. The circuit is arranged to detect an envelope of the RF input signal, and generate a low frequency (baseband) signal based on the signal envelope.

Digital conversion circuit 864 converts the analog baseband signal, ENV_IN to a digital output signal. Digital conversion circuit 864 may also be known as a decision device 864 or as slicer 864, and may be implemented in any number of ways. In the embodiment of FIG. 8, digital conversion circuit 864 employs a comparator 865 and a threshold generator 863. Typically, threshold generator 863 provides a threshold signal, VTHR (e.g. a DC (direct current) or slowly varying signal) to comparator 865. Another input of comparator 865 is arranged to receive the analog baseband signal, ENV_IN. Comparator 865 then provides a digital logic signal, which is based on a result of the comparison between the analog baseband signal and the threshold signal provided by threshold generator 863.

Figures 9A, 9B:
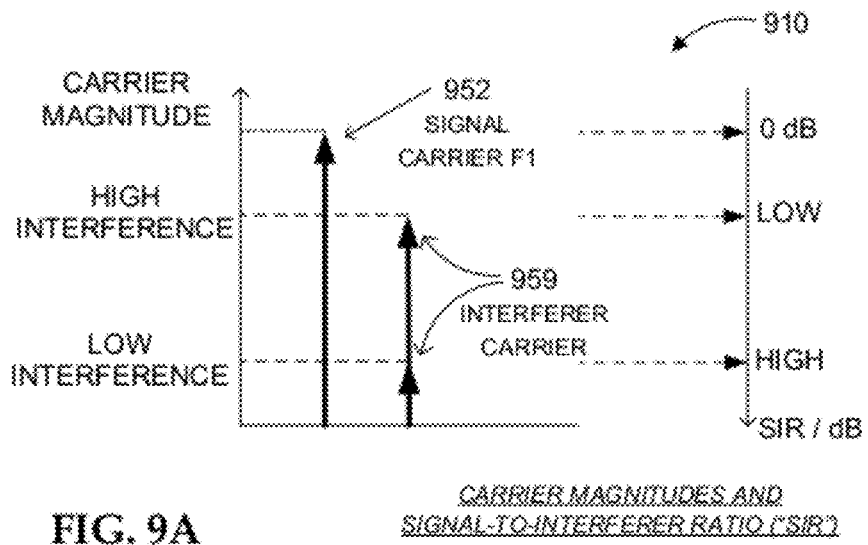
FIG. 9A is a diagram for illustrating the relative magnitudes of frequency carrier of a signal and of an interferer, and the inverse relationship of these relative magnitudes and Signal-to-Interferer ratio.
FIG. 9B is a table showing the maximum tolerated interference as defined in FIG. 9A, for a signal to be detected, for comparing the performance of various embodiments.

FIG. 9A is a diagram for illustrating the relative magnitudes of frequency carrier of a signal and of an interferer, and the inverse relationship of these relative magnitudes and Signal-to-Interferer ratio.

Diagram 910 illustrates signal carrier 952 with frequency F1. Next to the signal carrier 952 are interferers 959. An interferer may have a relatively large amplitude (high interference) resulting in a low Signal-to-Interferer (SIR) ratio or a relatively small amplitude (low interference) resulting in high SIR.

Because the SIR is a ratio, it is typically expressed in dB. Thus, SIR may correspond to 0 dB for interferers with the same amplitude as the signal carrier, with SIR values for interferers that have a smaller amplitude than the signal carrier being positive numbers.

FIG. 9B is a table 980 showing the maximum tolerated interference, as defined in FIG. 9A, for a signal to be detected, for comparing the performance of various embodiments. These are compared for different interferer types (far-channel, near-channel, co-channel), which were first described in FIGS. 7A, 7B, 7C.

As seen in row 989, a circuit, such as the one illustrated in FIG. 8, typically tolerates low interferers only as shown in FIGS. 7A through 7C.

Figure 10:
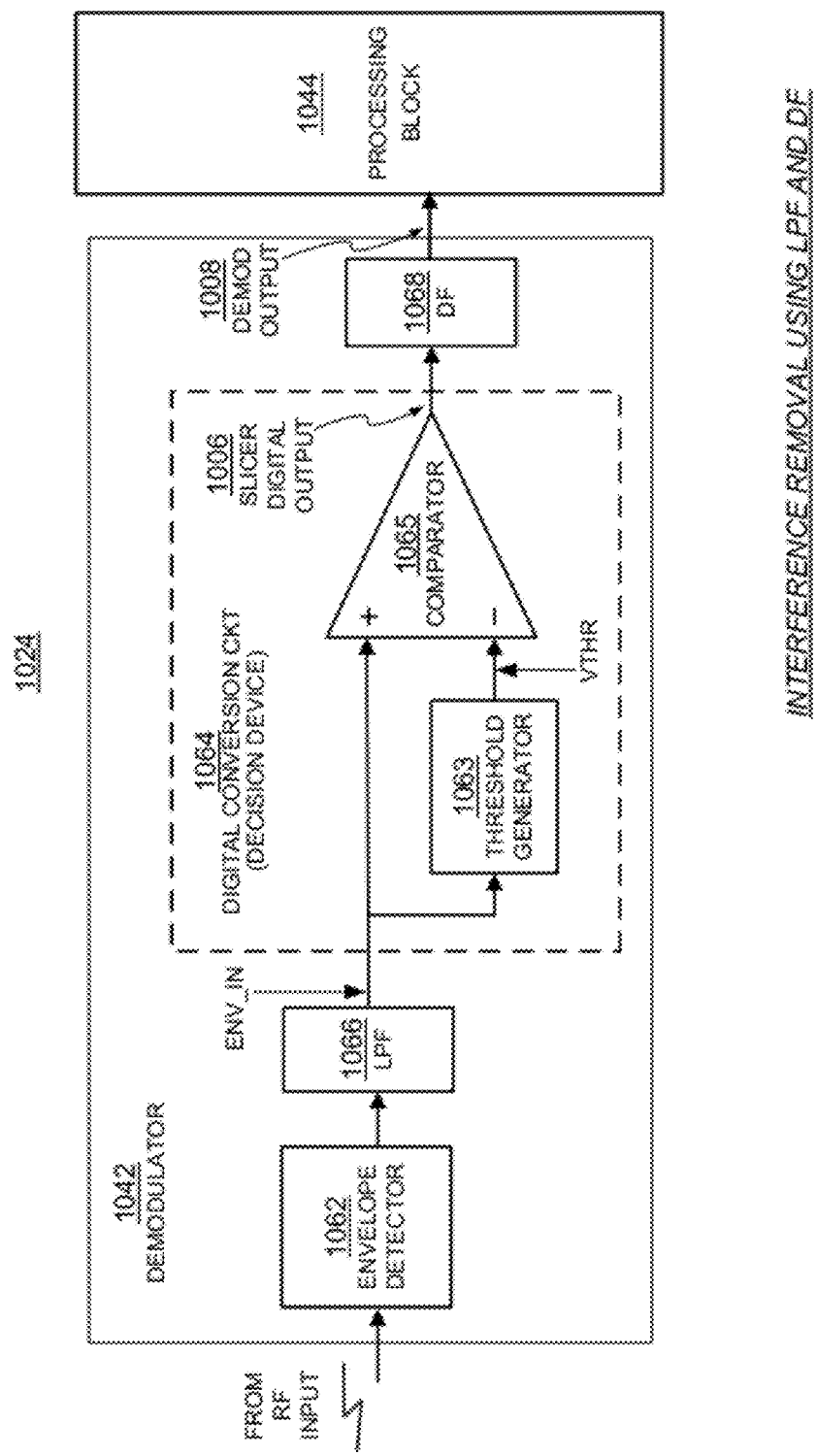
FIG. 10 schematically illustrates circuits of an RFID tag circuit for interference removal using a low pass filter and a digital filter.
Figure 11A:
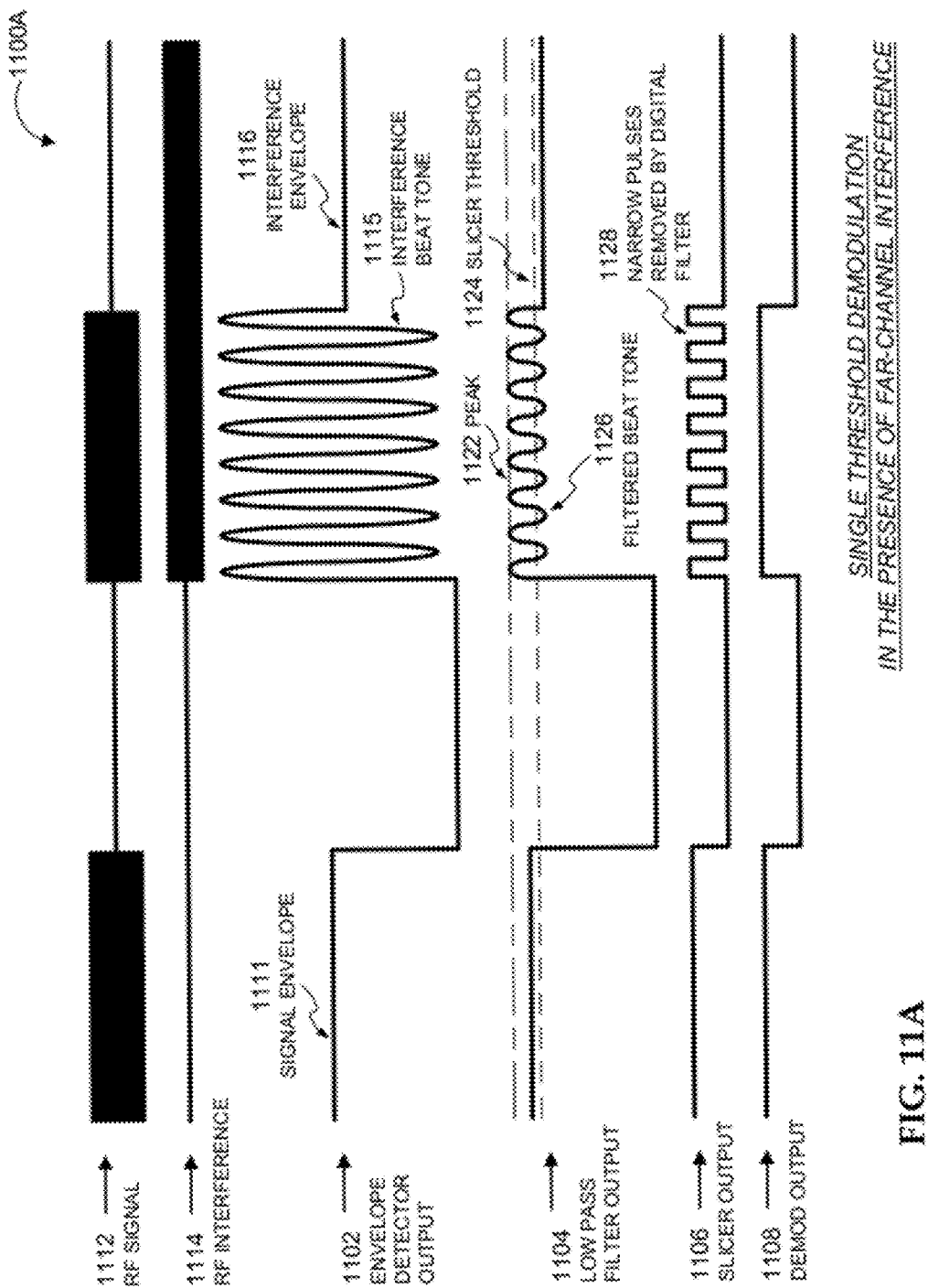
FIG. 11A illustrates waveforms in a single threshold RFID demodulation using a circuit like the circuit of FIG. 10 in the presence of a far-channel interferer, such as is shown in FIG. 7A.
Figure 11B:
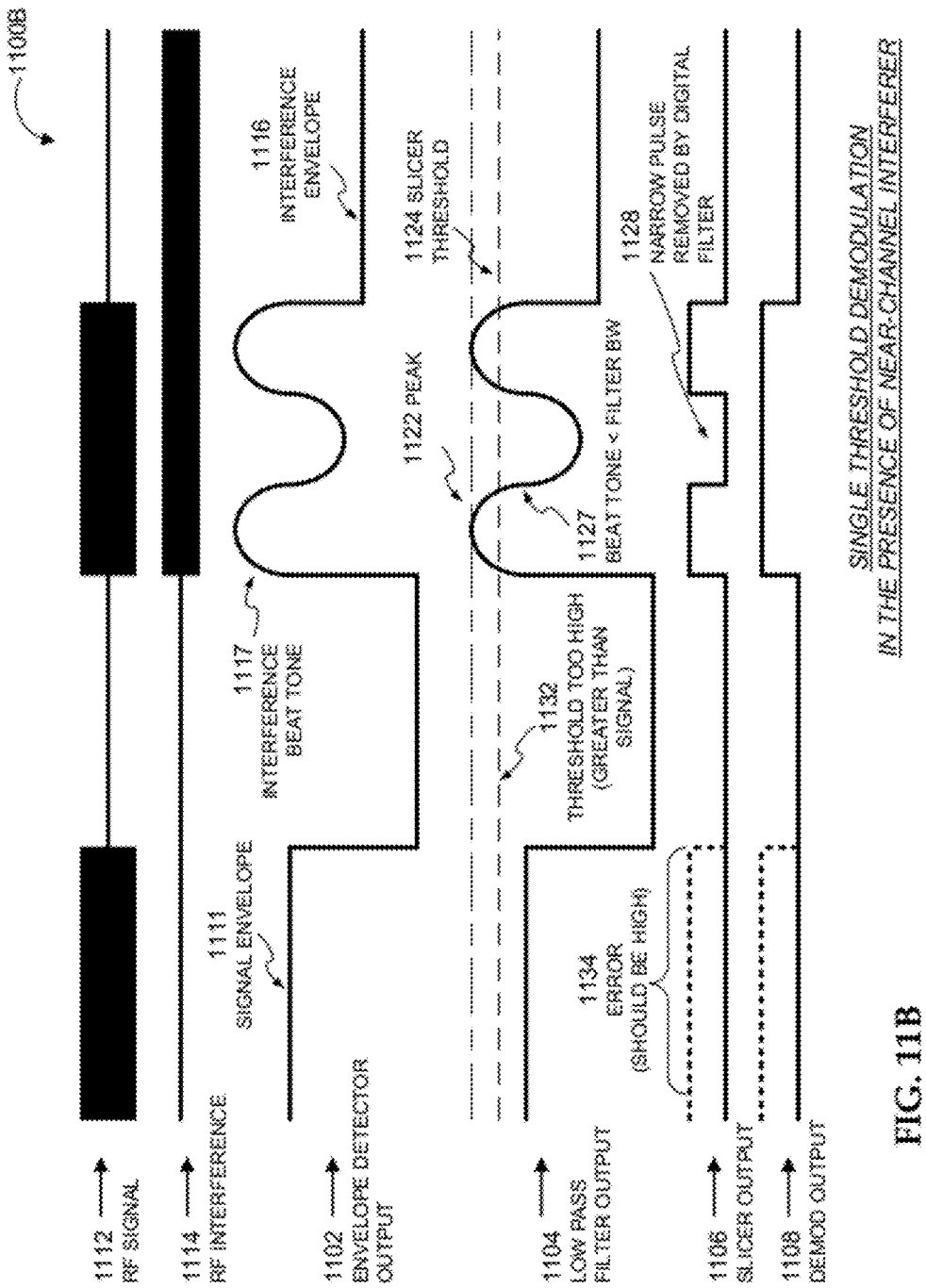
FIG. 11B illustrates waveforms in a single threshold RFID demodulation using a circuit like the circuit of FIG. 10 in the presence of a near-channel interferer, such as is shown in FIG. 7B.
Figure 11C:
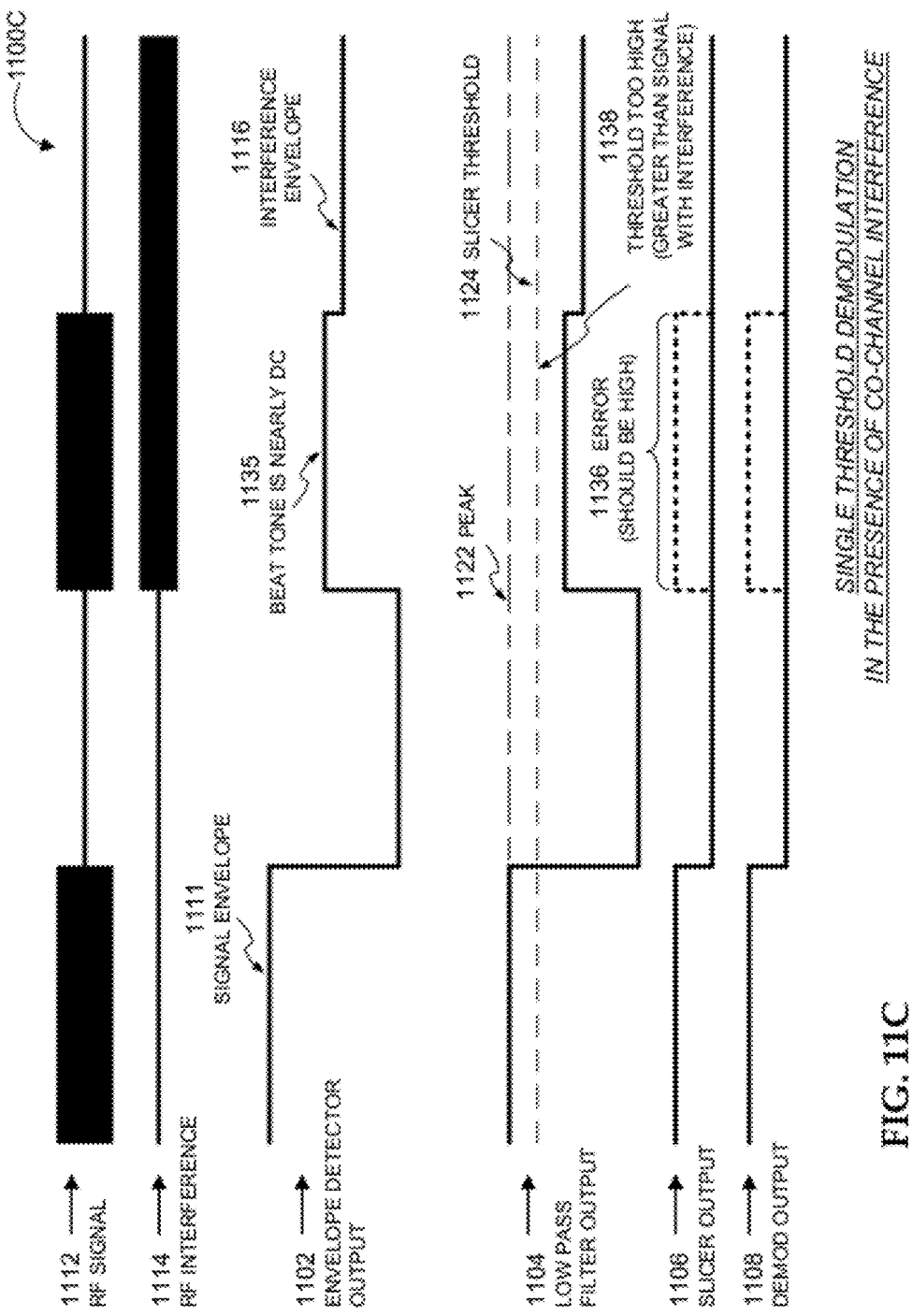
FIG. 11C illustrates waveforms in a single threshold RFID demodulation using a circuit like the circuit of FIG. 10 in the presence of a co-channel interferer, such as is shown in FIG. 7C.

As seen in row 1189, a circuit with a digital filter, such as the one illustrated in FIG. 10, may tolerate low interferers for near-channel and co-channel interference, but can accommodate highest interferers for far-channel interference as shown in FIGS. 11A through 11C.

Figure 13A:
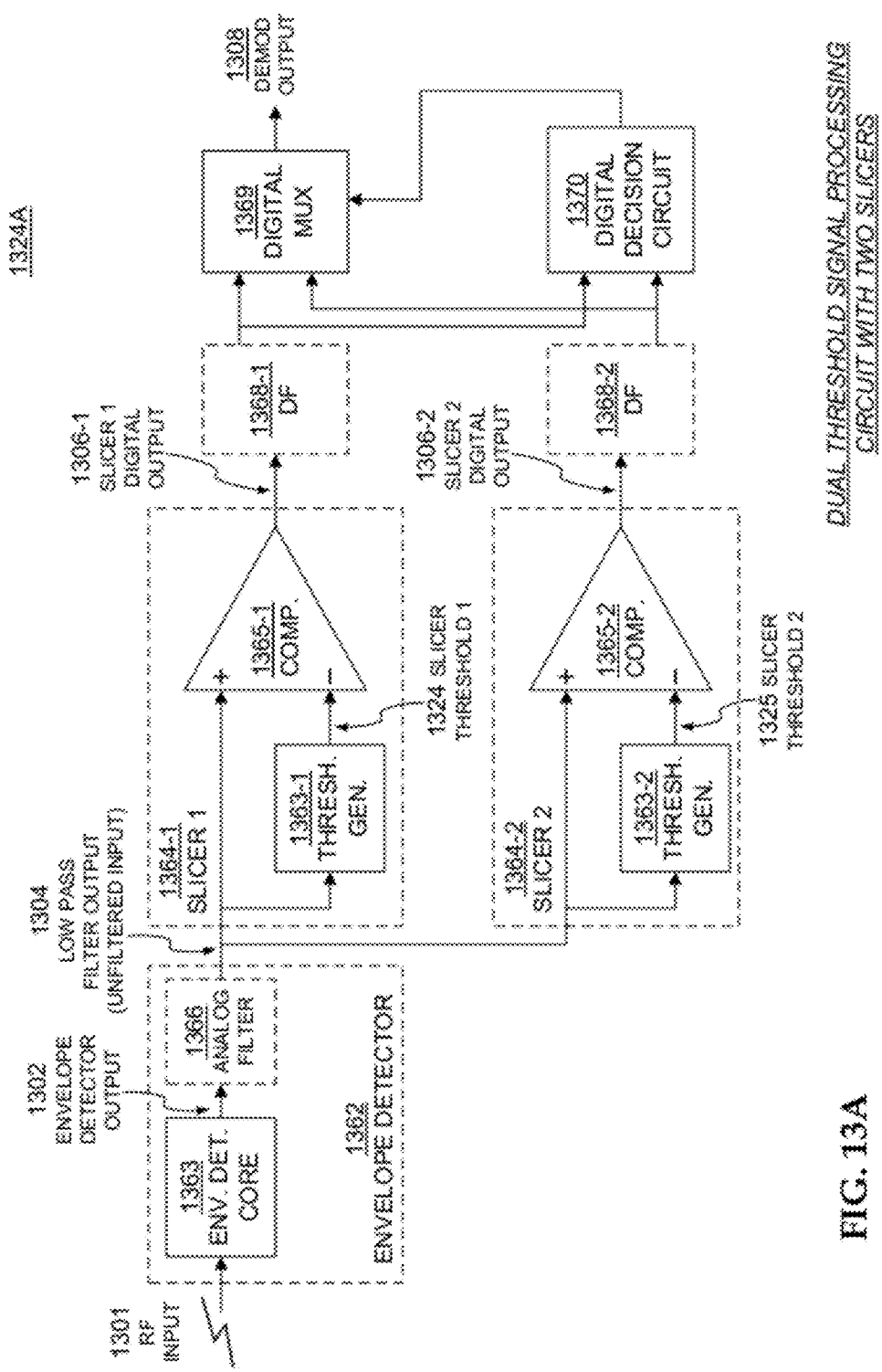
FIG. 13A is a schematic block diagram of circuits of an RFID tag for interference removal using two thresholds according to one embodiment.
Figure 14A:
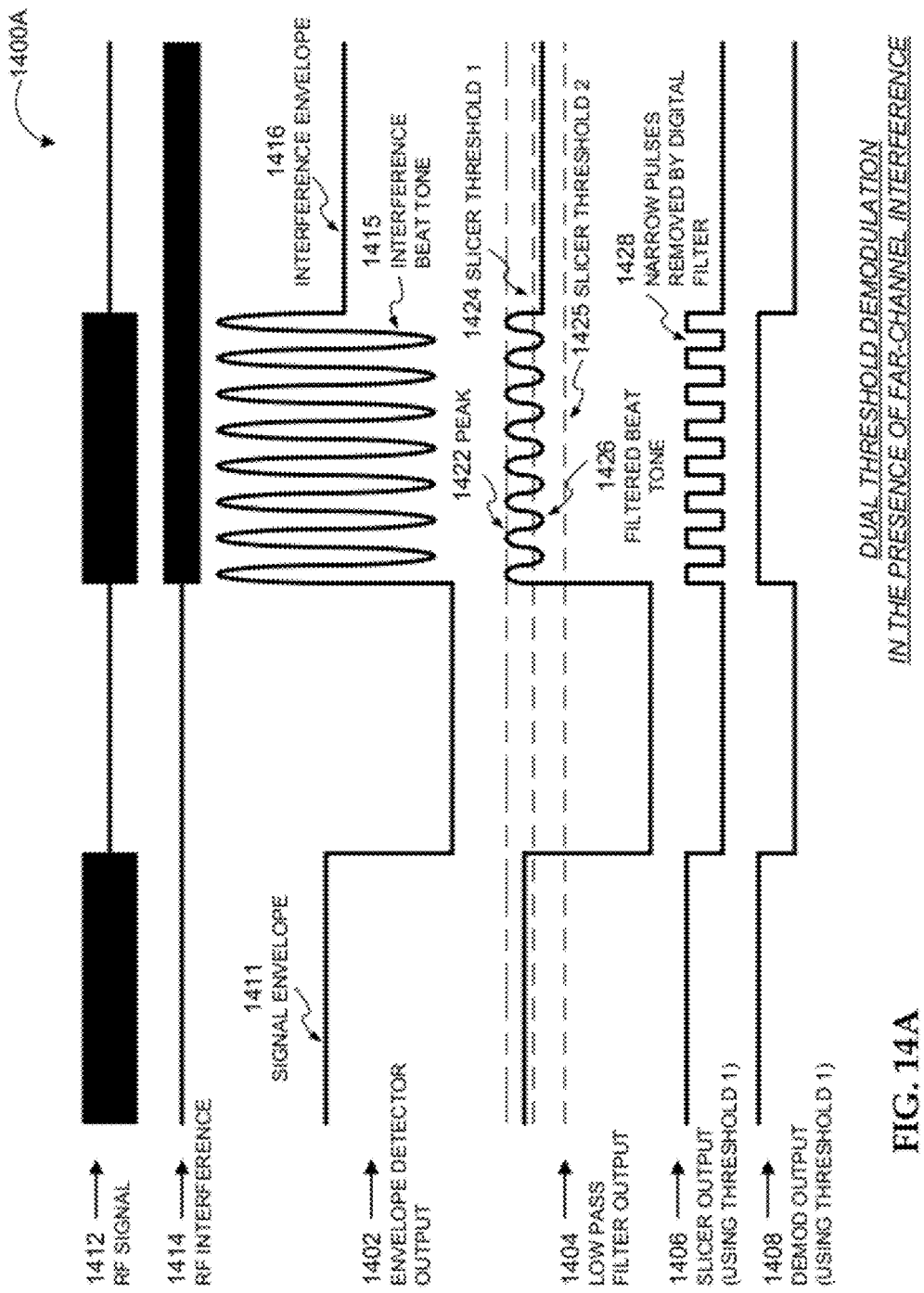
FIG. 14A illustrates waveforms in a dual threshold RFID demodulation using a circuit like the circuit of FIG. 13A, in the presence of a far-channel interferer, such as is shown in FIG. 7A.
Figure 14B:
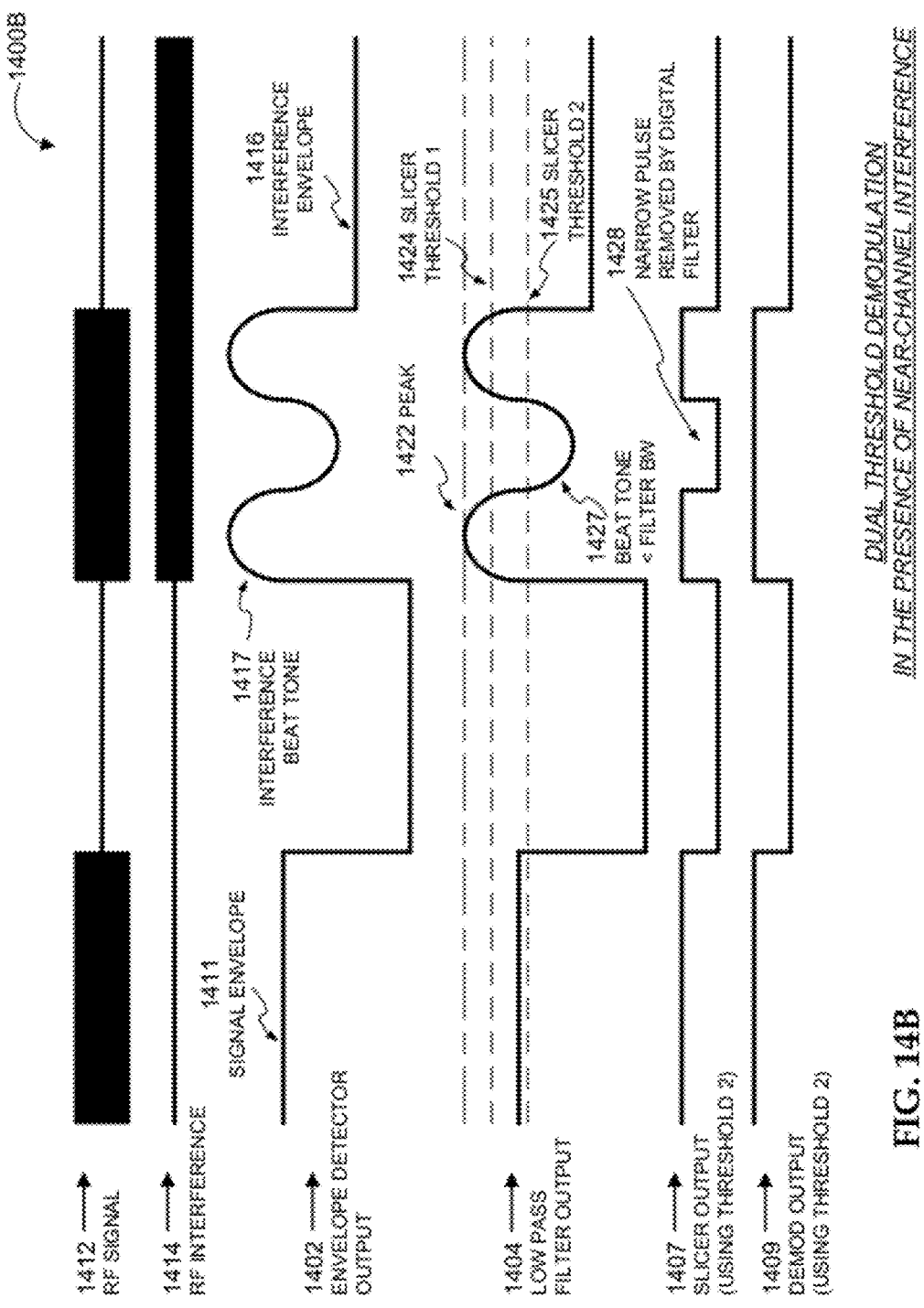
FIG. 14B illustrates waveforms in a dual threshold RFID demodulation using a circuit like the circuit of FIG. 13A, in the presence of a near-channel interferer, such as is shown in FIG. 7B.
Figure 14C:
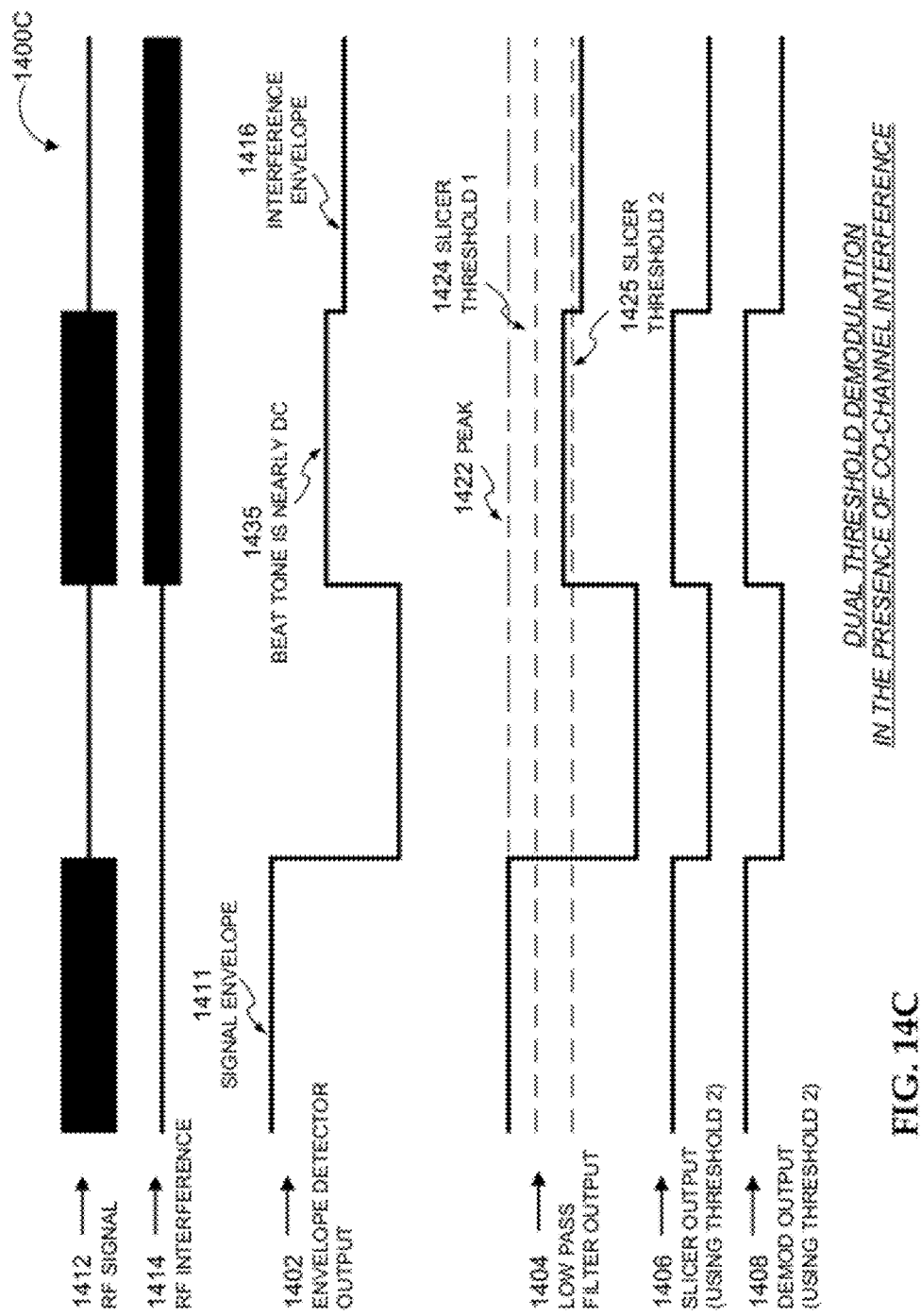
FIG. 14C illustrates waveforms in a dual threshold RFID demodulation using a circuit like the circuit of FIG. 13A, in the presence of a co-channel interferer, such as is shown in FIG. 7C.

As seen in row 1389 circuit using dual threshold, such as the one illustrated in FIG. 13A, may tolerate high interferers for near-channel and co-channel interference, and highest interferers for far-channel interference as shown in FIGS. 14A through 14C.

FIG. 10 schematically illustrates circuits of an RFID tag circuit for interference removal using a low pass filter and a digital filter.

Similar to the circuit 824 of FIG. 8, circuit 1024 of FIG. 10 includes demodulator 1042 with an envelope detector 1062, followed by a digital conversion circuit 1064. Low pass filter LPF 1066 may be placed between the envelope detector 1062 and digital conversion circuit 1064 for reducing an interference beat tone amplitude. Envelope detector 1062 is configured to convert modulated RF input to an analog baseband signal, which after filtering by LPF 1066 is provided to digital conversion circuit 1064 as ENV_IN.

Digital conversion circuit (decision device) 1064 converts the analog baseband signal, ENV_IN to a digital output signal. Digital conversion circuit 1064 may include a comparator 1065 and a threshold generator 1063. Threshold generator 1063 provides a threshold signal, VTHR to comparator 1065. Another input of comparator 1065 is arranged to receive the analog baseband signal, ENV_IN. Comparator 1065 then provides a digital logic signal, which is based on a result of the comparison between the analog baseband signal and the threshold signal provided by threshold generator 1063.

A digital filter 1068 between demodulator 1042 and processing block 1044 may be employed to remove narrow pulses caused by interference. Use of a digital filter for removing artifacts from the digitized signal such as narrow pulses caused by interference is described in detail in U.S. patent application Ser. No. 10/823,991, filed Apr. 13, 2004, which is incorporated by reference.

The architecture of circuit 1024 is presented for purposes of explanation, and not of limitation. Its particular subdivision into specific components need not be followed for creating embodiments according to the invention. Furthermore, the features of the invention can be performed either with fewer components, or by a combination of them.

FIG. 11A illustrates waveforms in a single threshold RFID demodulation using a circuit like the circuit of FIG. 10 in the presence of a far-channel interferer, such as is shown in FIG. 7A.

Diagram 1100A shows all four possible states of RF signal 1112 and RF interferer 1114. The output of the envelope detector 1102 includes signal envelope 1111 and beat tone 1115 created by sum of RF signal and RF interferer. The far-channel interferer has a high frequency offset making the beat tone easy to filter. A frequency of the beat tone is substantially equal to an absolute difference of the frequencies of the RF signal and the RF interferer (|Fsig−Fint|).

The output of the low pass filter 1104 includes a filtered version of the beat tone 1126, where the peaks 1122 that exceed the slicer threshold 1124 are still included in the signal. Thus, slicer output 1106 includes narrow pulses 1128, which are removed by the digital filter as described above resulting in a demodulation output 1108 without any effects of the interference.

FIG. 11B illustrates waveforms in a single threshold RFID demodulation using a circuit like the circuit of FIG. 10 in the presence of a near-channel interferer, such as is shown in FIG. 7B.

Diagram 1100B shows RF signal 1112 and RF interferer 1114. The output of the envelope detector 1102 includes signal envelope 1111 and beat tone 1117. Because the near-channel interferer has low frequency offset, the beat tone is more difficult to filter. Higher beat tone amplitude at low pass filter output 1104 raises slicer threshold 1124 such that the threshold is even higher than the signal (1132). As indicated by reference numeral 1127, the beat tone is smaller than the filter bandwidth.

While the narrow pulses 1128 created by the beat tone can be removed by the digital filter at the slicer output 1106, the higher threshold may cause a misread of the RF signal where the interferer is not present. Signal envelop 1111 is not detected as a digital high value in demodulator output 1108 (error 1134) due to the slicer threshold 1124 being too high.

FIG. 11C illustrates waveforms in a single threshold RFID demodulation using a circuit like the circuit of FIG. 10 in the presence of a co-channel interferer, such as is shown in FIG. 7C.

Diagram 1100C also shows RF signal 1112 and RF interferer 1114. The output of the envelope detector 1102 includes signal envelope 1111 and beat tone 1135. Because the co-channel interferer has near zero frequency offset, the beat tone cannot be filtered.

A sum of RF signal 1112 and RF interferer 1114 depends on a phase of each signal. The signals may be superimposed when the phases are close and the threshold may be set higher than the RF signal similar to the near-channel interference described in FIG. 11B.

On the other hand, if the phases do not match (e.g. 180 deg or similar difference), the slicer threshold 1124 may be too high (1138) for the sum of the two signals resulting in the RF signal in the presence of co-channel interferer not being detected (error 1136) at the output of the slicer 1106. The digital filter cannot cure this problem. Thus the demodulator output 1108 still includes error 1136.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention may include Non-Volatile Memory (NVM) or other forms of memory circuits that can be implemented on a tag.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a tag with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID tag can be implemented as a combination of hardware and software. It is advantageous to consider such a system as subdivided into components or modules. A person skilled in the art will recognize that some of these components or modules can be implemented as hardware, some as software, some as firmware, and some as a combination.

Methods are now described more particularly according to embodiments.

Figure 12:
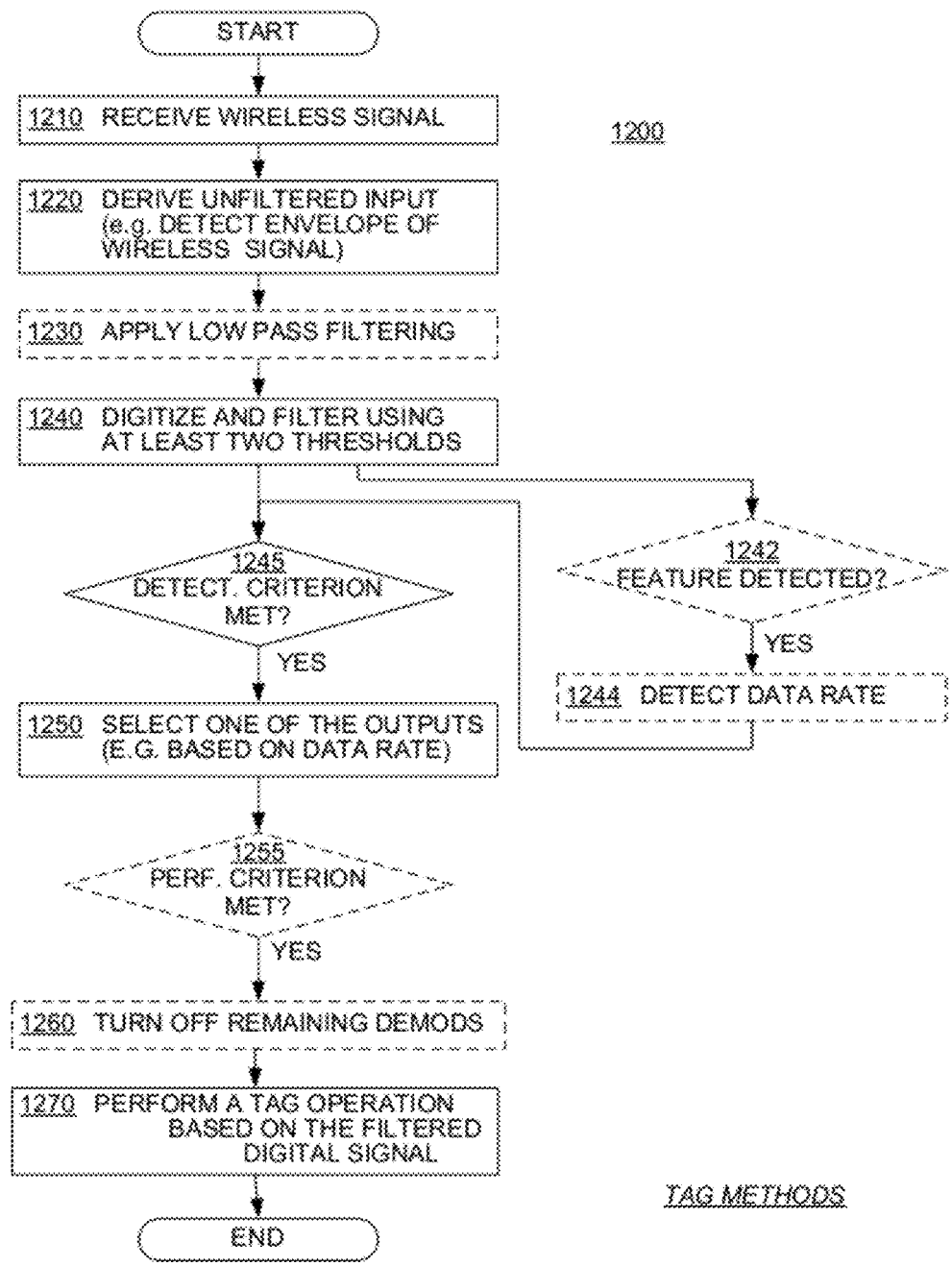
FIG. 12 is a flowchart of a process for RFID signal detection using two thresholds in an RFID tag circuit according to embodiments.

FIG. 12 is a flowchart of a process for RFID signal detection using two thresholds in an RFID tag circuit according to embodiments.

Process 1200 begins at operation 1210, where a wireless signal is received by the tag. The wireless signal may include a signal transmitted by a reader and interference from another source.

According to next operation 1220, an unfiltered input is derived from the received wireless signal, for example, by detecting an envelope of the wireless signal.

According to a next optional operation 1230, the unfiltered input is filtered using a low pass filter to reduce a beat tone amplitude.

According to a next operation 1240, the filtered input is digitized and digitally filtered using at least two thresholds.

According to a next decision operation 1245, a determination is made whether a detection criterion is met. If the determination is affirmative, processing continues to next operation 1250.

In an alternate embodiment, operation 1240 may be followed by optional decision operation 1242 where a determination is made whether a feature is detected in the received signal, such as a frame synch or a preamble. If the feature is detected, the data rate of the received signal may be detected at a next optional operation 1244, from where the processing continues to decision operation 1245.

At operation 1250 following the affirmative determination at decision operation 1245, one of the outputs is selected (for example, based on the data rate of the received signal). Other decision mechanisms may also be employed in selecting one of the outputs.

At a next decision operation 1255, a determination is made whether a performance criterion is met. The performance criterion can be associated with detecting a feature, such as a frame synch, a preamble, a command, etc.

If the performance criterion is met, remaining demodulators may be turned off to conserve power at a next optional operation 1260.

At a next operation 1270, a tag operation is performed by a tag circuit (e.g. processing block) based on the filtered digital signal.

The operations included in process 1200 are for illustration purposes. Adaptable detection thresholds in an RFID tag may be implemented by similar processes with fewer or additional steps, as well as in different order of operations using the principles described herein.

An economy is achieved in the present document in that a single set of flowcharts is used to describe methods in and of themselves, along with operations of hardware and/or software. This is regardless of how each element is implemented.

According to some embodiments, a method for a circuit of an RFID tag includes deriving an unfiltered input from a wireless signal received by the tag, the wireless signal including distortion due to interference, generating two digital outputs from the unfiltered input using two distinct decision thresholds, generating a filtered output by selecting one of the digital outputs, and performing an operation responsive to the filtered output. Either one of the unfiltered input and filtered output may include a number or a signal.

The method may further include filtering each digital output employing respective digital filters, an artifact feature deriving from the distortion thereby being removed from at least one of the digital outputs. At least one of the digital filters may be a narrow pulse digital filter, and one of the digital output may be selected based on a detection criterion. The detection criterion may include determining a frame synch, a preamble, or a command, preferably those that are valid according to the specified protocol. Both digital outputs may be received in a multiplexer, and the filtered output may be an output from the multiplexer.

According to other embodiments, the method may include generating an additional digital output using an additional decision threshold and filtering the additional digital output using a digital filter. The narrow pulse digital filter may comprise a plurality of filters with a distinct narrow pulse digital filter for each digital output. One of the plurality of filters may be set to detect all data rates, and at least one of the remaining filters may be set to detect a subset of the data rates. Setting a filter to detect all data rates includes setting an aperture of the filter to a minimum width.

According to further embodiments, a demodulator circuit may be used to generate each respective digital output, and the method may further include applying power to one or more of, or even all the demodulator circuits. These can remain powered until a performance criterion is met, indicating the satisfaction with the output. There can be many types of performance criteria. Once the performance criterion is met, one of the demodulator circuits can be selected to generate the digital output, possibly as indicated from the performance criteria, metrics in the detection of the frame synch or preamble, and so on. The remaining demodulator circuits can be powered down, to conserve power.

According to yet other embodiments, the method may include selecting the demodulator circuit to generate the digital output based on detecting a falling edge of a symbol following an RTcal signal, or a frame synch or a preamble. If a higher threshold demodulator circuit has detected the falling edge, a frame synch, or a preamble, using the higher threshold demodulator circuit to generate the digital output, else using a lower threshold demodulator circuit to generate the digital output. A data rate of the input may be determined based on the frame synch or preamble detection and a demodulator circuit clock frequency adjusted based on the determined data rate. The demodulator circuit clock frequency may be adjusted by reducing the clock frequency if the data rate is below a predefined value.

The demodulator circuit clock frequency may also be adjusted based on which demodulator circuit is selected to generate the digital output. The unfiltered input may be filtered employing an analog filter before generating the digital outputs. The analog filter may be a low pass filter. The unfiltered input may also be filtered employing a distinct low pass filter for each of the digital outputs, where each low pass filter is configured to have a distinct bandwidth.

As has been mentioned, the invention also provides dual threshold circuits for RFID tags. These can be implemented in integrated circuit form.

Now referring to FIG. 13A, an example schematic block diagram of a dual threshold circuit of an RFID tag for interference removal using two thresholds is shown as an example only.

A dual threshold circuit according to embodiments, such as dual threshold circuit 1324A, can have a first circuit 1362 that is operable to derive an unfiltered input 1304 from a wireless signal 1301 received by the tag. The wireless signal 1301 includes distortion due to interference, which can give rise to an artifact.

Input circuit 1324 according to embodiments of the invention can also include a second circuit (1364-1, 1364-2), which is operable to generate two respective digital outputs 1306-1, 1306-2 from the unfiltered input 1304. The digital outputs 1306-1, 1306-2 can be generated using two distinct decision thresholds at a number of places in dual threshold circuit 1324A.

In addition, a dual threshold circuit according to embodiments of the invention can also include a selection circuit, which is operable to generate a filtered output 1308, by selecting one of the digital outputs 1306-1, 1306-2. In circuit 1342, which is only an example, the selection circuit is implemented by a digital multiplexer 1369 and a digital decision circuit 1370, although other implementations are equivalently possible.

In some embodiments, the dual threshold circuit further includes two digital filters, each for filtering a respective one of the two digital outputs, in such a way that an artifact feature deriving from the distortion is removed from at least one of the digital outputs.

More particularly, the example of dual threshold circuit 1324A is a dual threshold demodulator 1324A, in which two slicers (1364-1 and 1364-2) and a single common envelope detector 1362 are used. Envelope detector 1362 may include envelope detector core 1363 arranged to receive RF input 1301 and provide envelope detector output 1302 to optional analog filter 1366, which may be a low pass filter.

Low pass filter output (or unfiltered input) 1304 is provided to both slicers. Slicers 1364-1 and 1364-2 include a comparator each (1365-1 and 1365-2), which are arranged to compare the low pass filter output 1304 to slicer thresholds 1324 and 1325 provided by threshold generators 1363-1 and 1363-2. Slicer thresholds 1324 and 1325 are different from each other and the slicers may share some circuitry. Part or all of the threshold generators may be incorporated into one or more of the comparators. In that case slicer thresholds 1324 and/or 1325 may not correspond to unique circuit nodes as shown in FIG. 13A. Instead, one or more of the slicer thresholds may be implemented as an offset voltage of a comparator. A high threshold provides optimum SIR for far-channel interferers, while a low threshold provides optimum SIR for near- and co-channel interferers. Using the low threshold, the near- and co-channel SIR may still be worse than the far-channel SIR but is better than with the high threshold.

Slicer digital outputs 1306-1 and 1306-2 are provided by the comparators to digital filters 1368-1 and 1368-2. Digital multiplexer 1369 directs one of the digital filter outputs to the demod output 1308. Digital decision circuit 1370 identifies proper slicer output.

The proper slicer may be selected based on metrics from the frame synch or preamble detection, for example by searching for a frame synch, a preamble, commands, and the like. Digital decision circuit 1370 may wait until the falling edge of the symbol following RTcal for selecting the proper slicer. If the higher threshold slicer has successfully detected the frame synch or preamble, the higher threshold slicer is selected. Otherwise, the lower threshold slicer can be selected.

The lower threshold slicer is generally the first to detect a frame synch or preamble. Lower threshold implies that signal rising edge will be detected by the lower threshold slicer first. Using the falling edge of the symbol after RTcal allows time for upper threshold slicer to detect and time to update data decoding parameters (e.g. pivot value), based on which slicer is selected, prior to the next rising edge.

Figure 13B:
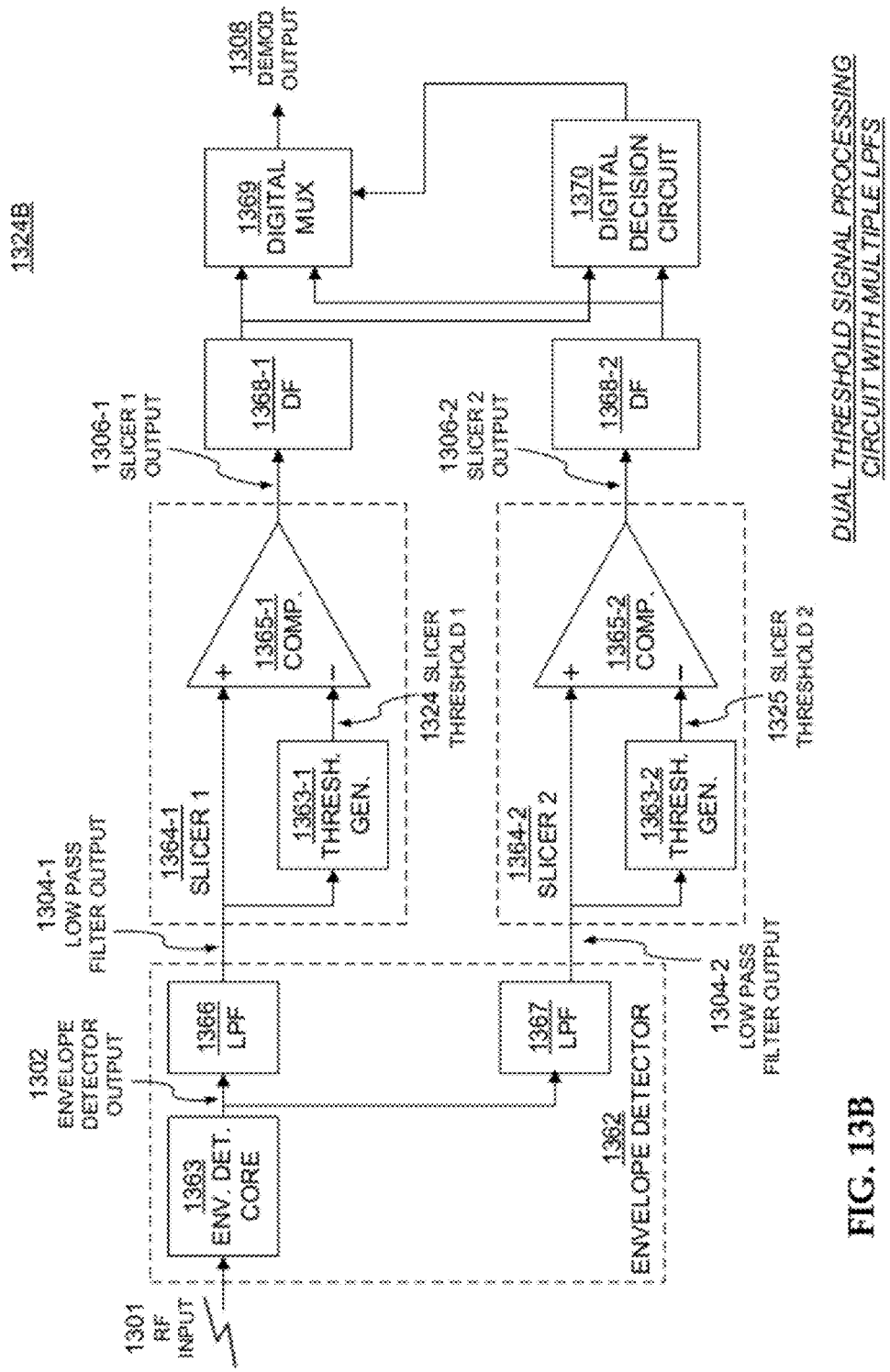
FIG. 13B is a schematic block diagram of circuits of an RFID tag for interference removal using two thresholds and two low pass filters according to another embodiment.

FIG. 13B is a schematic block diagram of circuits of an RFID tag for interference removal using two thresholds and two low pass filters according to another embodiment.

Parts of circuit 1324B that are similarly numbered as in circuit 1324A of FIG. 13A operate in a likewise manner in both circuits. Differently from circuit 1324A, envelope detector 1362 includes two low pass filters 1366 and 1367 providing low pass filter outputs 1304-1 and 1304-2 to each of the slicers 1364-1 and 1364-2.

Each of the low pass filters 1366 and 1367 may be configured to have distinct bandwidths such that beat tone amplitudes may be reduced depending on a bandwidth of the selected slicer (and associated low pass filter).

Figure 13C:
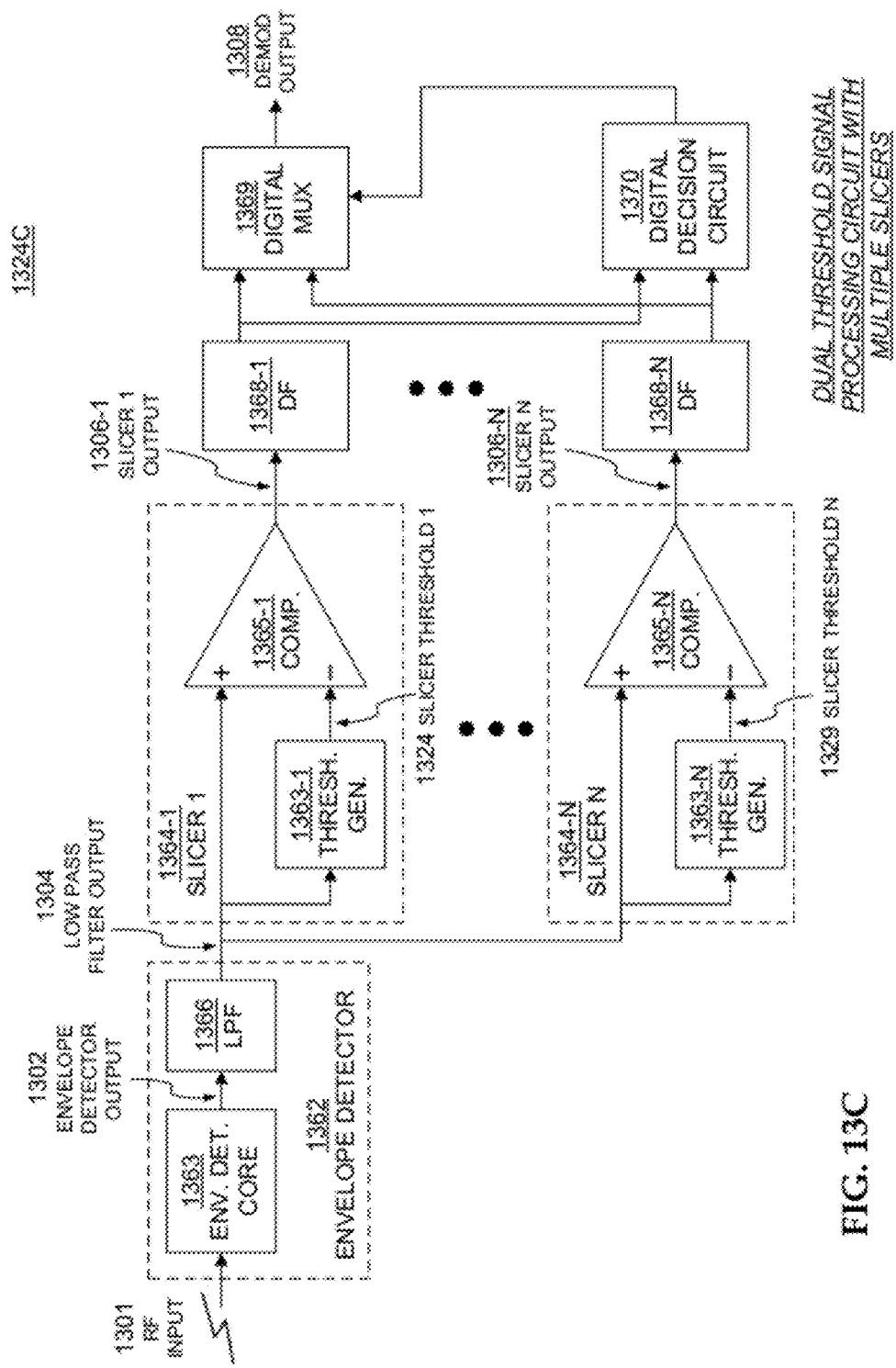
FIG. 13C is a schematic block diagram of circuits of an RFID tag for interference removal using multiple thresholds according to a further embodiment.

FIG. 13C is a schematic block diagram of circuits of an RFID tag for interference removal using multiple thresholds according to a further embodiment.

Parts of circuit 1324C that are similarly numbered as in circuit 1324A of FIG. 13A operate in a likewise manner in both circuits. Differently from circuit 1324A, circuit 1324C includes multiple slicers (1364-1 through 1364-N) and digital filters (1368-1 through 1368-N). Digital decision circuit 1370 controls a selection of which combination of slicer/digital filter is to be used for the demod output 1308 by digital multiplexer 1369.

During packet detection, a digital filter is preferably set to its minimum (i.e. least robust) aperture. The R→T data rate for the next packet is unknown to the tag. Therefore, the digital filter aperture needs to be initially set to allow detection of the highest data rates. Highest data rates have minimum symbol feature size and require minimum digital filter aperture.

Multiple demodulator paths according to embodiments not only allow the use of multiple slicer thresholds, but also allow the use of multiple digital filters. One digital filter may be configured to detect all data rates, and a second filter to detect only a subset of data rates. If the second filter is not required to detect the highest data rates, it can detect all other data rates using a wider minimum aperture. This provides greater interference rejection. Furthermore, lower data rates (e.g. dense reader mode) may become more tolerant of interference.

Use of two or more demodulators may increase tag power consumption. A tag range is inversely proportional to the square root of tag power consumption. According to other embodiments, both or all demodulator paths may be used for frame synch or preamble detection but only one is selected to decode the payload. Selection occurs near the end of the frame synch or preamble detection and is based on preamble metrics or other criteria.

The unused demodulator path circuits may be turned off upon selection and powered up again when it is time to detect the next packet. The unused demodulator paths may be turned off by clock gating, switching off bias currents, and the like.

FIG. 14A illustrates waveforms in a dual threshold RFID demodulation using a circuit like the circuit of FIG. 13A, in the presence of a far-channel interferer, such as is shown in FIG. 7A.

Diagram 1400A shows RF signal 1412 and RF interferer 1414. Similar to diagram 1100A of FIG. 11A, the output of the envelope detector 1402 includes signal envelope 1411, beat tone 1415 created by sum of RF signal and RF interferer, and interference envelope 1416.

The output of the low pass filter 1404 includes a filtered version of the beat tone 1426, where the peaks 1422 exceed both slicer thresholds 1424 and 1425. Narrow pulses 1428 generated by the beat tone are removed by the digital filter from the slicer output 1406 resulting in a demodulation output 1408 without any effects of the interference. Thus, the second slicer threshold does not have a visible effect on the far-channel interferer.

FIG. 14B illustrates waveforms in a dual threshold RFID demodulation using a circuit like the circuit of FIG. 13A, in the presence of a near-channel interferer, such as is shown in FIG. 7B.

Diagram 1400B shows RF signal 1412 and RF interferer 1414. The output of the envelope detector 1402 includes signal envelope 1411 and interference beat tone 1417. Because the near-channel interferer has low frequency offset, the beat tone envelope 1416 is lower and the beat tone is more difficult filter. Higher first slicer threshold 1424 raised by the higher beat tone amplitude at low pass filter output 1404 may result in the RF signal without interference being missed by the slicer, but the second threshold 1425, which is lower, enables correct detection of the RF signal.

Thus, a demodulator output using second threshold 1425 may be selected for removal of near-channel interference effects resulting in higher SIR. As in FIG. 11B, the narrow pulses 1428 created by the beat tone can be removed by the digital filter at the slicer output 1406.

FIG. 14C illustrates waveforms in a dual threshold RFID demodulation using a circuit like the circuit of FIG. 13A, in the presence of a co-channel interferer, such as is shown in FIG. 7C.

Diagram 1400C also shows RF signal 1412 and RF interferer 1414. The output of the envelope detector 1402 includes signal envelope 1411, beat tone 1435 with near zero frequency offset, and interference envelope 1416.

As described before. RF signal 1412 and RF interferer 1414 may be superimposed when their phases are close and first threshold 1424 may be sufficient. On the other hand, if the phases do not match (e.g. 180 deg or similar difference), the first slicer threshold 1424 may be too high for the sum of the two signals resulting in the RF signal in the presence of co-channel interferer not being detected at the output of the slicer 1406. In this scenario, the lower second threshold 1425 may solve the problem of FIG. 11C detecting the lower combined signal.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

We claim:

1. A dual threshold circuit of a Radio Frequency Identification (RFID) tag, comprising:
   an envelope detector configured to receive a modulated wireless RF input signal and further configured to derive an analog output signal responsive to the modulated wireless RF input signal;
   a first slicer circuit configured to derive a first unfiltered digital output signal responsive to the analog output signal and to a first analog decision threshold;
   a second slicer circuit configured to derive a second unfiltered digital output signal responsive to the analog output signal and to a second analog decision threshold;
   a selection circuit configured to derive a filtered digital output signal by selecting one of the first and second unfiltered digital outputs;
   a multiplexer of the selection circuit configured to select one of the first and second unfiltered digital outputs; and
   a digital decision circuit for configuring the multiplexer to select one of the first and second unfiltered digital outputs based on a performance criterion.

2. The dual threshold circuit of claim 1, wherein at least a portion of the circuitry for the first and second slicer circuits is common to both.

3. The dual threshold circuit of claim 1, further comprising:
   at least one additional slicer circuit configured to derive an additional unfiltered digital output signal responsive to the analog output signal and to an additional analog decision threshold.

4. The dual threshold circuit of claim 1, wherein the selection circuit includes a digital filter responsive to at least one of the unfiltered digital outputs.

5. The dual threshold circuit of claim 4, wherein the digital filter is a narrow pulse digital filter.

6. The dual threshold circuit of claim 1, wherein the performance criterion includes at least one from a set of: a valid frame synch, a valid preamble, and a valid command.

7. The dual threshold circuit of claim 1, wherein the envelope detector contains a low pass analog filter.

8. The dual threshold circuit of claim 1, wherein the digital filtered output signal includes a number.

9. The dual threshold circuit of claim 1, wherein the digital filtered output signal includes a signal.

10. The dual threshold circuit of claim 1, wherein the selection circuit includes a plurality of digital filters responsive to at least one of the unfiltered digital outputs and is further configured to:
    set one of the digital filters to detect all data rates; and
    set at least one of the remaining filters to detect a subset of the data rates.

11. The dual threshold circuit of claim 10, in which the filter set to detect all data rates includes an aperture set to a minimum width.

12. A dual threshold circuit for a circuit of a Radio Frequency Identification (RFID) tag, comprising:
    an envelope detector configured to receive a modulated wireless RF input signal and further configured to derive an analog output signal responsive to the modulated wireless RF input signal;
    a first and a second slicer circuits configured to receive power until a performance criterion is met, the performance criterion signifying that a frame synch has been detected;
    a selection circuit configured to:
       select one of the first and second slicer circuits to generate an unfiltered digital output;
       discontinue applying power to the unselected one of the first and second slicer circuits; and
       derive a filtered digital output signal.

13. The dual threshold circuit of claim 12, in which the selection circuit is configured to select one of the first and second slicer circuits based on:
    detection of a falling edge of a symbol following an RTcal signal; and if a higher threshold slicer circuit has detected the falling edge, using the higher threshold slicer circuit to generate the unfiltered digital output, else if a lower threshold slicer circuit has detected the falling edge, using the lower threshold slicer circuit to generate the unfiltered digital output.

14. The dual threshold circuit of claim 12, in which the selection circuit is further configured to:

determine a data rate of the analog output signal; and adjust a clock frequency of the selection circuit based on the determined data rate.

15. The dual threshold circuit of claim 14, in which
the selection circuit clock frequency is adjusted by reducing the clock frequency if the data rate is below a predefined value.

16. The dual threshold circuit of claim 14, in which the selection circuit clock frequency is adjusted based on which slicer circuit is selected to generate the unfiltered digital output.

* * * * *

UNITED STATES PATENT AND TRADEMARK OFFICE
CERTIFICATE OF CORRECTION

PATENT NO.         : 8,258,955 B1                                    Page 1 of 1
APPLICATION NO.    : 13/012413
DATED              : September 4, 2012
INVENTOR(S)        : Hyde et al.

It is certified that error appears in the above-identified patent and that said Letters Patent is hereby corrected as shown below:

On the Title Page, Item [56]:

Please delete "μ m" in second page, column 2 (other publications), line 15 and insert -- μm --, therefor, Please delete "Ciruits" in second page, column 2 (other publications), line 16 and insert -- Circuits --, therefor, Please delete "Massachesetts" in second page, column 2 (other publications), line 18 and insert -- Massachusetts --, therefor, Please delete ""Kill"Feature" in second page, column 2 (other publications), line 20 and insert -- "Kill" Feature --, therefor, and In the Specification:

Please delete "intereferer." in column 9, line 11 and insert -- interferer. --, therefor.

Signed and Sealed this
Thirteenth Day of August, 2013

Teresa Stanek Rea
*Acting Director of the United States Patent and Trademark Office*